(12) United States Patent
Li

(10) Patent No.: US 11,616,362 B2
(45) Date of Patent: Mar. 28, 2023

(54) CURRENT-SHARING CONTROL CIRCUIT, POWER SUPPLY SYSTEM AND CURRENT-SHARING CONTROL METHOD

(71) Applicant: CommScope Technologies LLC, Hickory, NC (US)

(72) Inventor: Mankun Li, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 383 days.

(21) Appl. No.: 16/848,231

(22) Filed: Apr. 14, 2020

(65) Prior Publication Data

US 2020/0343723 A1 Oct. 29, 2020

(30) Foreign Application Priority Data

Apr. 25, 2019 (CN) .......................... 201910336385.1

(51) Int. Cl.
*H02M 3/158* (2006.01)
*H02J 1/10* (2006.01)

(52) U.S. Cl.
CPC .............. *H02J 1/106* (2020.01); *H02J 1/102* (2013.01)

(58) Field of Classification Search
CPC .......... H02M 3/1584; H02M 3/33561; H02M 1/0009; H02J 1/102; H02J 1/106
See application file for complete search history.

(56) References Cited

U.S. PATENT DOCUMENTS 7,739,525 B2 * 6/2010 Bird ........................ G06F 1/263
713/300
9,035,628 B2 5/2015 Chan et al.
9,748,830 B1 * 8/2017 Soleño .................... H02J 1/102
(Continued)

FOREIGN PATENT DOCUMENTS

EP 1473820 A2 11/2004
WO 2016/073145 A1 5/2016

OTHER PUBLICATIONS

Extended European Search Report corresponding to European Application No. 20170806.2 (10 pages) (Aug. 12, 2020).

(Continued)

*Primary Examiner* — Jared Fureman
*Assistant Examiner* — Esayas G Yeshaw
(74) *Attorney, Agent, or Firm* — Myers Bigel, P.A.

(57) ABSTRACT

A current-sharing control circuit, a power supply system and a current-sharing control method are disclosed. One embodiment of the power supply system comprises: multiple CV/CC power supplies connected in parallel to a load, whose nominal output voltages are the same and CV mode to CC mode switching points are adjustable; a current-sharing control circuit including an average load current sensor which senses a total current supplied to the load and outputs a first level linearly related to an average load current equal to the total current divided by the number of the working power supplies, and an output current sensor which senses an output current of each power supply and outputs a second level linearly related to the output current. The control circuit provides feedback signals related to the first level and the respective second levels to the power supplies to adjust their switching points to the average load current.

20 Claims, 5 Drawing Sheets

(56) References Cited

U.S. PATENT DOCUMENTS

| | | | |
|---|---|---|---|
| 2007/0063681 A1* | 3/2007 | Liu | H02M 3/1588 |
| | | | 323/282 |
| 2009/0167080 A1* | 7/2009 | Carpenter | H02M 3/1584 |
| | | | 307/14 |
| 2015/0108908 A1* | 4/2015 | Denvir | H05B 45/50 |
| | | | 315/186 |
| 2016/0164414 A1* | 6/2016 | Hang | H02M 3/1584 |
| | | | 323/271 |
| 2016/0172977 A1* | 6/2016 | Cai | H02M 1/14 |
| | | | 323/271 |
| 2016/0211745 A1* | 7/2016 | Hang | H02M 3/1584 |
| 2019/0045595 A1* | 2/2019 | Johnsen | H05B 45/46 |

OTHER PUBLICATIONS

Analog Devices: MT-068 Tutorial "Difference and Current Sense Amplifiers" (6 pages) (Dec. 31, 2019).

* cited by examiner

CURRENT-SHARING CONTROL CIRCUIT, POWER SUPPLY SYSTEM AND CURRENT-SHARING CONTROL METHOD

RELATED APPLICATION(S)

The present application claims priority from and the benefit of Chinese Patent Application No. 201910336385.1, filed Apr. 25, 2019, the disclosure of which is hereby incorporated herein in its entirety.

FIELD OF THE INVENTION

The present disclosure relates to sharing load by multiple power supplies.

DESCRIPTION OF RELATED ART

Many large electronic systems (e.g., computing servers, disk storage arrays, communication equipment, etc.) require a large amount of operating power, so it is often desirable to have multiple power supplies connected in parallel to provide the required operating power. In some base stations, an antenna sharing hub is used to support a plurality of antennas, and to support driving a plurality of remote electrical tilting units (RETs), which is desirable to uniformly draw current from a plurality of power supplies. However, when multiple power supplies are connected in parallel to the load, it is difficult to ensure that each parallel-connected power supply provides the same output current, because of differences in wiring, temperature and other factors among the power supplies. It is desirable to provide a control circuit to better balance the output currents among the power supplies.

SUMMARY OF THE INVENTION

One of the objectives of the present invention is to provide a novel current-sharing control circuit and method, as well as a power supply system.

According to a first aspect of the present invention, a power supply system is provided. The power supply system may comprise: multiple CV/CC power supplies, wherein the multiple CV/CC power supplies are connected in parallel to a load, the nominal output voltages of the multiple CV/CC power supplies are the same, and a CV mode to CC mode switching point of each of the multiple CV/CC power supplies is adjustable; a current-sharing control circuit, including an average load current sensor and an output current sensor; wherein the average load current sensor senses a total current supplied to the load and outputs a first level linearly related to an average load current, the average load current being the total current divided by the number of the working power supplies; wherein the output current sensor senses an output current of each of the multiple CV/CC power supplies, and outputs a second level linearly related to the output current of the corresponding CV/CC power supply; wherein the current-sharing control circuit provides feedback signals related to the first level and the respective second levels to the respective CV/CC power supplies, so as to adjust a switching point of the corresponding CV/CC power supply to the average load current.

According to a second aspect of the present invention, a current-sharing control circuit is provided, which is configurable to be connected to multiple CV/CC power supplies and enable at least two of the power supplies to share a load, where the nominal output voltages of the multiple CV/CC power supplies are the same, and a CV mode to CC mode switching point of each of the multiple CV/CC power supplies is adjustable. The current-sharing control circuit may comprise: an average load current sensor, which senses a total current supplied to the load and outputs a first level linearly related to an average load current, the average load current being the total current divided by the number of the working power supplies; and an output current sensor configurable to be connected to the multiple CV/CC power supplies, wherein the output current sensor senses an output current of each of the multiple CV/CC power supplies, and outputs a second level linearly related to the output current of the corresponding CV/CC power supply, wherein the current-sharing control circuit provides feedback signals related to the first level and the respective second levels to the respective CV/CC power supplies, so as to adjust a switching point of the corresponding CV/CC power supply to the average load current.

According to a third aspect of the present invention, a method for performing current-sharing control on multiple CV/CC power supplies is provided, wherein the multiple CV/CC power supplies are connected in parallel to a load, the nominal output voltages of the multiple CV/CC power supplies are the same, and a CV mode to CC mode switching point of each of the multiple CV/CC power supplies is adjustable. The method may comprise: sensing a total current supplied to the load and outputting a first level linearly related to an average load current, the average load current being the total current divided by the number of the working power supplies; sensing output currents of the respective CV/CC power supplies, and outputting second levels linearly related to the respective output currents; and providing feedback signals related to the first level and the respective second levels to the respective CV/CC power supplies, so as to adjust a switching point of the corresponding CV/CC power supply to the average load current.

Other features of the present invention and the advantages thereof will become apparent through the following detailed descriptions of exemplary embodiments of the present invention with reference to the accompanying drawings.

BRIEF DESCRIPTION OF THE DRAWINGS

The accompanying drawings, which constitute a part of the specification, illustrate embodiments of the present invention and, together with the description, serve to explain the principles of the present invention. The present disclosure will be better understood according the following detailed description with reference of the accompanying drawings.

FIGS. 5A and 5B are schematic circuit diagrams of an average load current sensor according to one or more exemplary embodiments of the present invention, in which FIG. 5A shows one example of an average current sensing portion therein, and FIG. 5B shows one example of a processing portion therein.

Figure 1:
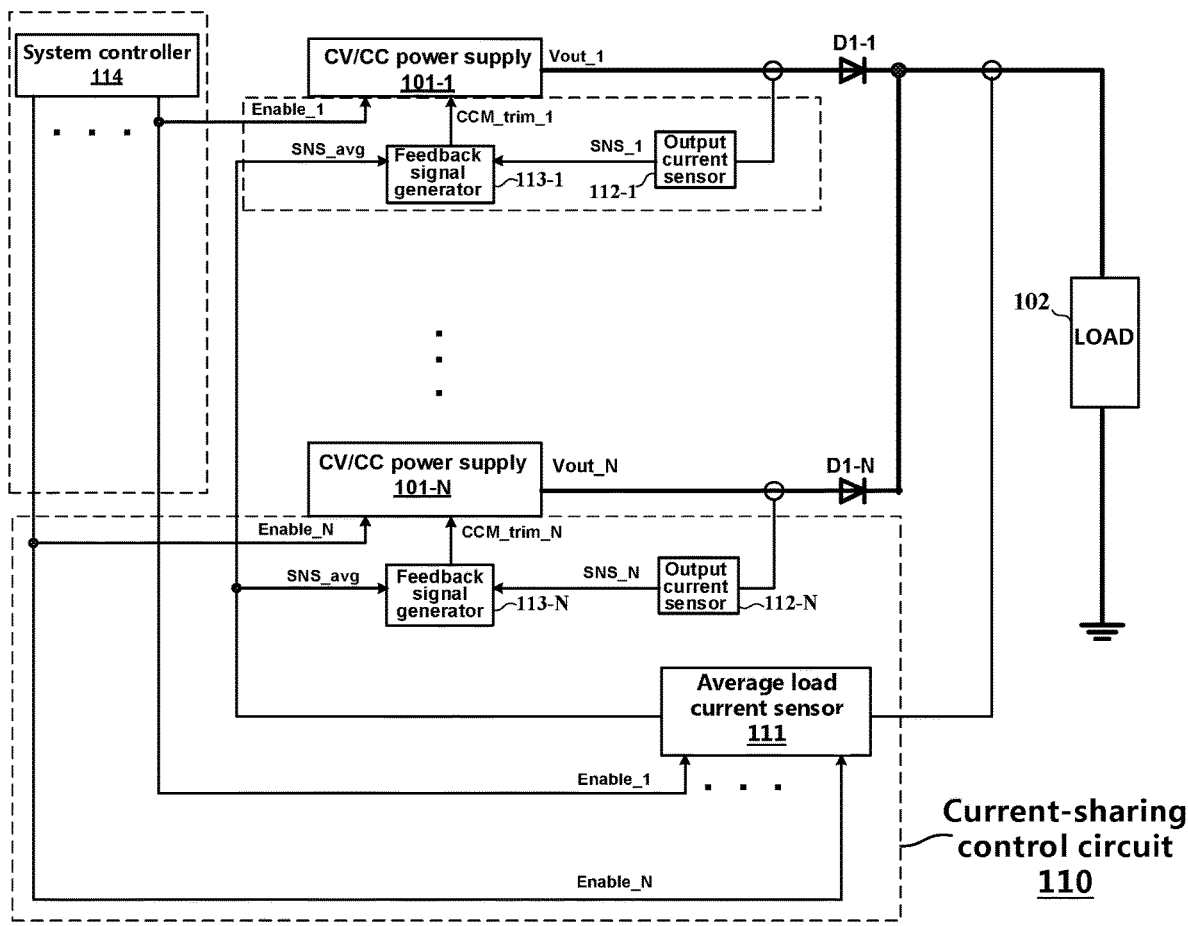
FIG. 1 is a schematic block diagram of a power supply system according to some exemplary embodiments of the present invention.

Note that, in the embodiments described below, in some cases the same portions or portions having similar functions are denoted by the same reference numerals in different drawings, and description of such portions is not repeated. In some cases, similar reference numerals and letters are used to refer to similar items, and thus once an item is defined in one figure, it need not be further discussed for following figures.

In order to facilitate understanding, the position, the size, the range, or the like of each structure illustrated in the drawings and the like are not accurately represented in some cases. Thus, the disclosure is not necessarily limited to the position, size, range, or the like as disclosed in the drawings and the like.

DETAILED DESCRIPTION

The present invention will be described with reference to the accompanying drawings, which show a number of example embodiments thereof. It should be understood, however, that the present invention can be embodied in many different ways, and is not limited to the embodiments described below. Rather, the embodiments described below are intended to make the disclosure of the present invention more complete and fully convey the scope of the present invention to those skilled in the art. It should also be understood that the embodiments disclosed herein can be combined in any way to provide many additional embodiments.

Please note that, the terminology used herein is for the purpose of describing particular embodiments, but is not intended to limit the scope of the present invention. All terms (including technical terms and scientific terms) used herein have meanings commonly understood by those skilled in the art unless otherwise defined. For the sake of brevity and/or clarity, well-known functions or structures may be not described in detail.

Herein "CV/CC" in the term "CV/CC power supply" is short for "Constant Voltage/Constant Current". Those skilled in the art would understand that, the "CV/CC power supply" means that, the power supply operates in a constant voltage mode when the load current is small, and when the load current is greater than the critical value, the power supply switches to the constant current mode, as will be described in detail later in conjunction with FIG. 2.

Figure 2:
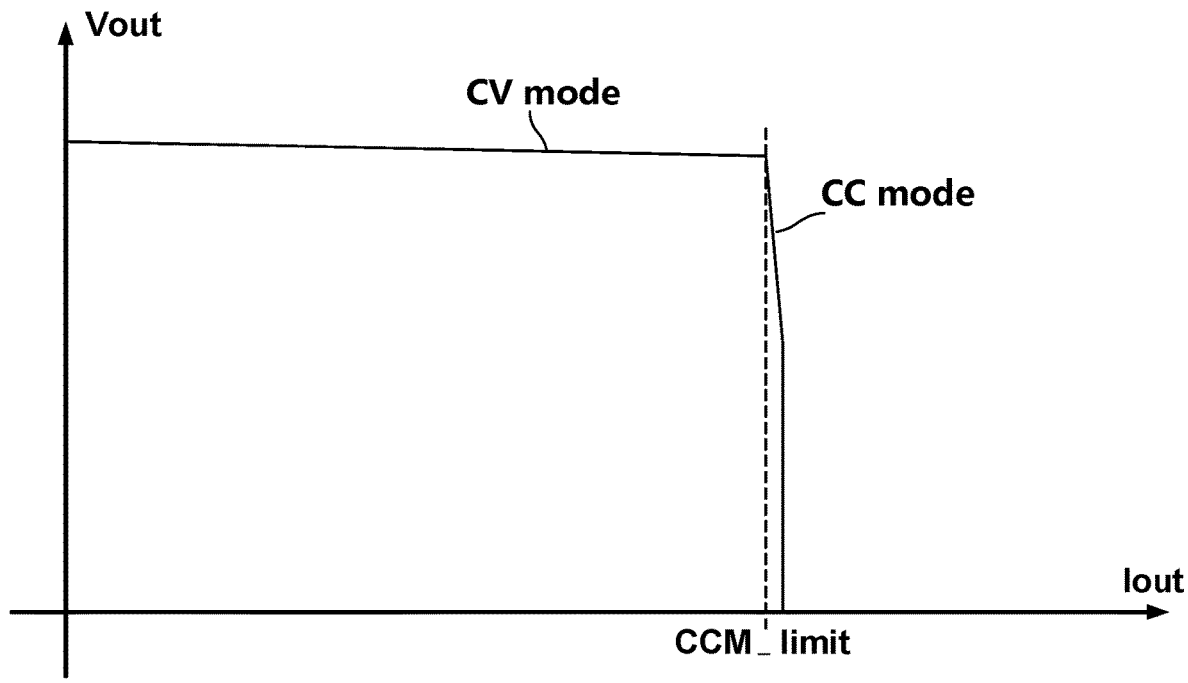
FIG. 2 is a schematic graph of output voltage vs. output current of a CV/CC power supply according to some exemplary embodiments of the present invention.

Pursuant to embodiments of the present invention, methods and corresponding circuits are provided that may increase the uniformity of the output currents of a plurality of parallel-connected CV/CC power supplies. The nominal output voltages of the CV/CC power supplies are the same, but the input voltages may be the same or different, that is to say, these power supplies may perform a boost/buck operation on the input voltages to maintain a constant output voltage. In addition, the switching point where the power supplies switch between the CV mode and the CC mode (i.e., the aforementioned critical value of the load current) may be adjustable. By feeding back the output currents of the respective CV/CC power supplies and the average load current (i.e., the load current share that each power supply should share) to the respective power supplies, the solution according to the present invention adjusts the switching points of the respective CV/CC power supplies to an average load current, and makes the corresponding CV/CC power supply switch to the CC mode when its output current is greater than the average load current, according to the voltage-current ("V-I") characteristics of the power supply (as illustrated in FIG. 2 below), which then makes the output voltage drop sharply, thus reducing the output current. Eventually, the respective power supplies will remain dynamically balanced, operating near the critical point, that is, keeping the output current substantially equal to the average load current. In this way, the load currents that are drawn from the respective power supplies may be kept uniform. The solution according to the present invention enables multiple power supplies to automatically share the load with relatively high precision, and can be widely applied to various kinds of power supplies.

For a more complete and clear understanding of the present invention, the structures and working principles of the power supply system and the current-sharing control circuit therein according to the present invention will be described in details below with reference to the accompanying drawings. It should be understood by those skilled in the art that, the present invention is not limited to the structures as shown in the drawings, but can be adapted to other systems. For example, the arrangement of the system controller, the feedback signal generator, the diode and the like as shown in the drawings is illustrative only and non-limiting. Rather, the present invention may be applied or adapted with simple modifications to other arrangement of the system controller, the feedback signal generator, the diode and the like, and/or may omit one or more of these components.

FIG. 1 is a schematic block diagram of a power supply system 100 according to an example embodiment of the present invention. Please note that, other components may also be present in the actual system, but in order to avoid obscuring the gist of the present invention, the drawings and the specification will not show and discuss such other components.

As shown in FIG. 1, the power supply system 100 comprises N CV/CC power supplies 101-1 to 101-N (the suffixes in the reference numerals are only for distinguishing between components of the same name, and the CV/CC power supply may also be indicated by the reference numeral "101" without a suffix hereinafter; the same applies to other components). The N CV/CC power supplies are connected in parallel to a load 102 (the load 102 does not count as a part of the power supply system 100), where N is an integer greater than one. The nominal output voltages of these CV/CC power supplies are the same (e.g., 24V DC), and the point where each power supply 101 switches between CV mode and CC mode is adjustable. In the drawings, only two power supplies 101 and their associated circuits are shown for clarity, and other power supplies 101 and their associated circuits that are present when N is greater than 2 are represented by ellipses. Those skilled in the art will appreciate that the arrangements of the non-shown power supplies 101 and their associated circuits are the same as that shown in the drawings. The following is a detailed description of the first CV/CC power supply 101-1 and its associated circuits as an example.

FIG. 2 is a schematic graph of output voltage vs. output current of the CV/CC power supply 101-1 according to some exemplary embodiments of the present invention (i.e., a V-I graph).

The horizontal axis in FIG. 2 represents the output current $I_{out}$ of the power supply 101-1, and the vertical axis represents the output voltage $V_{out}$ of the power supply 101-1. The position of the dotted line in FIG. 2 corresponds to the switching point where the power supply 101-1 switches from CV mode to CC mode, and the corresponding output current value is designated as "CCM_limit." When the output current $I_{out}$ is greater than the value CCM_limit, the power supply 101-1 operates in the CC mode, and even a small increase in the output current results in a significant drop in the output voltage, and then the power supplied by the power supply 101-1 to a common load DC bus (such as the bus from the meeting point of the power supply branches to the load 102 as shown in FIG. 1) will not increase, the output current will decrease, and finally the power supply 101-1 will work near the switching point, so that the output current is substantially equal to the current CCM_limit at the switching point. Moreover, the switching point of each CV/CC power supply 101 is adjustable. For example, the switching point CCM_limit of the CV/CC power supply 101-1 may be adjusted to the average load current (i.e., the share of the load current that each power supply 101 should share evenly), so that the output current of the power supply 101-1 is substantially equal to the average load current, which can achieve the effect of uniformly sharing the load current between the power supplies 101.

There may be many ways to implement the CV/CC power supplies 101-1 according to the present invention. In some embodiments, each CV/CC power supply 101-1 may be a switching power supply that includes a Pulse Width Modulation ("PWM") controller. The PWM controller may typically include a feedback voltage terminal for receiving a feedback voltage and an error amplifier that compares the feedback voltage with an internal reference voltage so as to adjust the output voltage of the CV/CC power supply 101-1. A constant current feedback network and a constant voltage feedback network are connected to the feedback voltage terminal of the PWM controller. The constant voltage feedback network and the constant current feedback network may utilize two diodes for an "OR" logic operation so as to feed back the sample of the output voltage or the output current of the CV/CC power supply 101-1 to the feedback voltage terminal. The one of the voltage feedback value and the current feedback value that first reaches the internal reference voltage participates in the PWM feedback adjustment so as to determine whether the power supply 101-1 operates in a constant voltage mode or a constant current mode. In some examples, the constant current feedback network may receive the feedback signal CCM_trim_1 as shown in FIG. 1, and the constant voltage feedback network may receive the output voltage $V_{out\_1}$ of the CV/CC power supply 101-1. One specific example of the structure of the CV/CC power supply 101-1 according to the present invention will be described later in more detail in conjunction with FIG. 3. However, it will be understood by those skilled in the art that the present invention is not limited to the above examples, but can be applied to any kind of CV/CC power supply structures or power supply structures that are simply adapted according to the principles of the present invention, as long as the switching point of the CV/CC power supply is adjustable.

Returning to FIG. 1, the power supply system 100 further comprises a current-sharing control circuit 110 (the parts enclosed by the three dashed boxes in FIG. 1) that is used to evenly share the load current of N CV/CC power supplies 101.

The current-sharing control circuit 110 senses the total load current $I_{Total}$ and the output currents $I_{out}$ of the individual power supplies, and feeds back information regarding the average load current $I_{avg}$ ($I_{avg}=I_{Total}/N$) that each power supply 101 should share and the actual output currents $I_{out}$ to the respective power supplies 101. Specifically, the current-sharing control circuit 110 includes an average load current sensor 111, and N output current sensors 112-1 to 112-N for the N power supplies respectively.

The average load current sensor 111 is connected to the common load DC bus (the bus from the convergence point of all power supply branches to the load 102 as shown in FIG. 1) and senses the total current $I_{Total}$ supplied to the load 102, divides the total current $I_{Total}$ by the number (for example, N) of working power supplies 101, obtains the average load current $I_{avg}$, and outputs a first level control signal SNS_avg that is linearly related to the average load current $I_{avg}$.

Taking the circuit for the CV/CC power supply 101-1 as an example, the output current sensor 112-1 senses the output current $I_{out\_1}$ of the CV/CC power supply 101-1, and outputs a second level control signal SNS_1 that is linearly related to the output current $I_{out\_1}$.

The current-sharing control circuit 110 may also provide a feedback signal that is based on the first level control signal SNS_avg and the second level control signal SNS_1 to the CV/CC power supply 101-1, so as to adjust the switching point of the power supply 101-1 to the average load current $I_{avg}$, and make the power supply 101-1 switch between CV and CC modes according to the output current information. In some embodiments, the first level control signal SNS_avg and the second level control signal SNS_1 may be directly provided as the feedback signal to the power supply 101-1, where the first level control signal SNS_avg may be used to adjust the switching point, and the second level control signal SNS_1 is fed back to the constant current feedback network of the power supply 101-1. In other embodiments, for example, as shown in FIG. 1, the current-sharing control circuit 110 may further include N feedback signal generators 113-1 to 113-N to generate a combined signal of the first level control signal SNS_avg and the second level control signal SNS as the feedback signal.

As shown in FIG. 1, the feedback signal generator 113-1 receives the output SNS_1 of the output current sensor 112-1 and the output SNS_avg of the average load current sensor 111, and outputs to the CV/CC power supply 101-1 the feedback signal CCM_trim_1 that is linearly related to the difference (i.e., $I_{out\_1}-I_{avg}$) between the output current and the average load current. Therefore, in some embodiments, the feedback signal CCM_trim_1 can determine the operating mode of the power supply, so that the power supply is switched to the CC mode when $I_{out\_1}>I_{avg}$, causing the output voltage to drop sharply, thereby pulling $I_{out\_1}$ down to $I_{avg}$. Therefore, the output current of the power supply can be adjusted in a simple manner so as to automatically share the load.

In addition, in some embodiments, the current-sharing control circuit 110 may further include a system controller 114 as shown in FIG. 1, which is used to control ON/OFF states of the N power supplies. The system controller 114 outputs, to the respective power supplies, enable signals Enable_1 to Enable_N which respectively determine whether the corresponding power supply is enabled or disabled. Meanwhile, in order for the average load current sensor 111 to calculate the average load current, the system controller 114 also supplies the N enable signals Enable_1 to Enable_N to the average load current sensor 111. In this case, the aforementioned average load current $I_{avg}$ is no longer $I_{Total}/N$, but equal to $I_{Total}$ divided by the number of active enable signals.

In addition, as shown in FIG. 1, in order to prevent reverse current, diodes D1-1 to D1-N are also applied between the outputs of the respective power supplies and the load 102.

Next, some specific examples of the components in FIG. 1 will be given in conjunction with the drawings. It should be understood by those skilled in the art that, those structures as shown in the drawings are illustrative only and non-limiting.

First, the output current sensors 112 in FIG. 1 will be discussed. In some embodiments, all of the output current sensors 112 have the same configuration, e.g., each may be a high-side current detecting circuit, which outputs, as the second level, a sensing voltage in proportion to the output current of the corresponding power supply. Those skilled in the art would understand that, the term "high-side current detecting" herein means detecting the current between the power supply output and the load, and in many cases, a sensing resistor may be connected between the power supply output and the load, and a detecting voltage that is proportional to the output current of the power supply may be obtained by bypass measuring the voltage across the sensing resistor.

In some embodiments, the high-side current detecting circuit may comprise: a sensing resistor, having a first end coupled to the voltage output of the CV/CC power supply and a second end coupled to the load, wherein the output current of the CV/CC power supply flows substantially through the sensing resistor; a current mirror circuit, having first and second branches respectively connected to the two ends of the sensing resistor; and a sensing voltage output branch connected to the first branch, and configured to output a sensing voltage proportional to a differential voltage across the sensing resistor such that the sensing voltage is in the first proportion to the output current of the CV/CC power supply.

Figure 4:
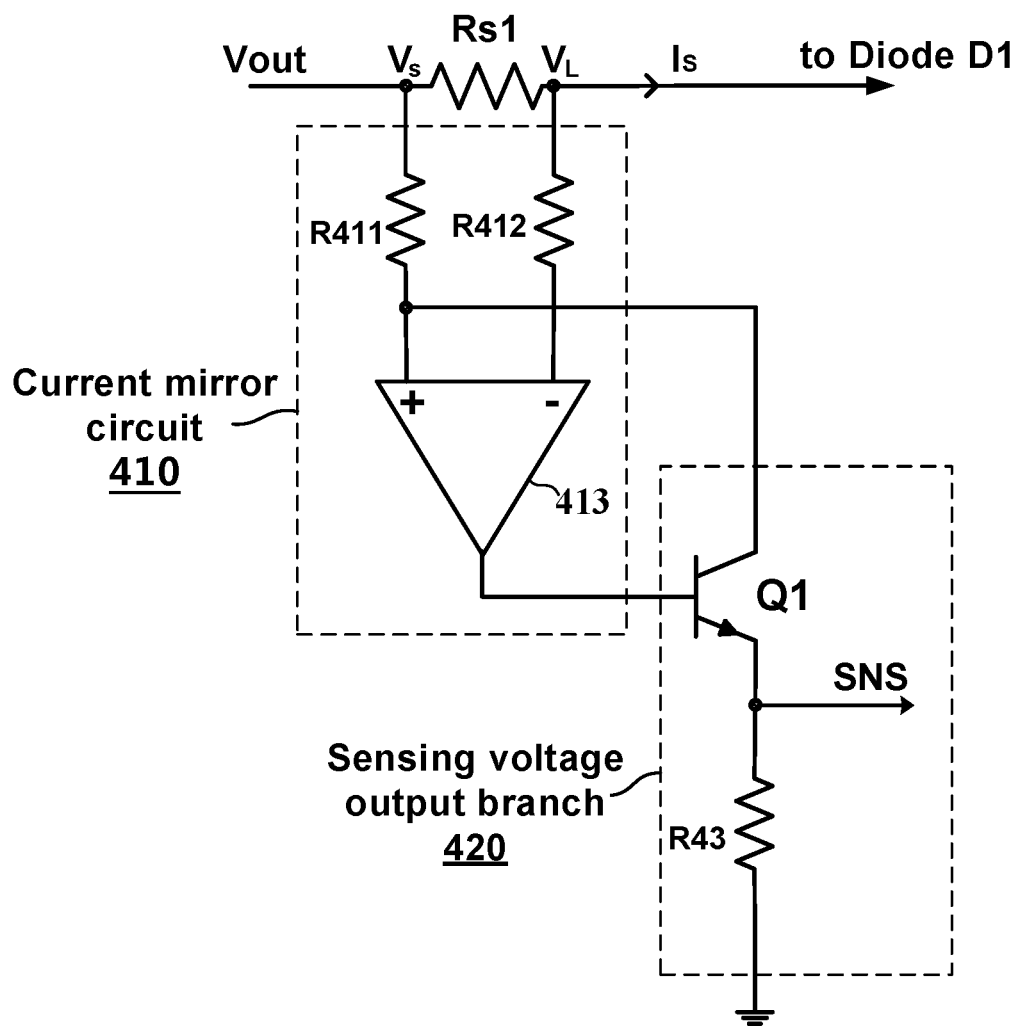
FIG. 4 is a schematic circuit diagram of an output current sensor according to one or more exemplary embodiments of the present invention.

FIG. 4 schematically illustrates a specific configuration of one output current sensor 112 according to an example embodiment of the present invention. Each of the output current sensors 112-1 to 112-N in FIG. 1 may be implemented as the output current sensor 112 illustrated in FIG. 4.

As shown in FIG. 4, the output current sensor 112 comprises a sensing resistor Rs1, a current mirror circuit 410 and a sensing voltage output branch 420. A first end of the sensing resistor Rs1 is connected to the voltage output of the power supply, and its second end is coupled to the load through the diode D1 of FIG. 1. The voltages at both ends of the sensing resistor Rs1 are $V_S$ and $V_L$ respectively, where $V_S$ is equal to the output voltage $V_{out}$ of the power supply. Both ends of the sensing resistor Rs1 are respectively connected to two branches of the current mirror circuit 410. Since the magnitudes of the currents of the two branches in the current mirror circuit 410 are much less than the magnitude of the current $I_S$, the current $I_S$ flowing through the sensing resistor Rs1 is substantially equivalent to the output current $I_{out}$ of the power supply.

The two branches of the current mirror circuit 410 are mirrored, generally having the same devices and connection ways, thus the active devices in the two branches generally work in the same state, and the same current flows through them. Specifically, the current mirror circuit 410 in FIG. 4 comprises an operational amplifier 413, as well as resistors R411 and R412 respectively connected to the non-inverting and inverting inputs of the operational amplifier 413. The other ends of the resistors R411 and R412 are respectively connected to two ends of the sensing resistor Rs1. The resistors R411 and R412 are matched resistors, i.e., having substantially the same device parameters and structures, e.g., the same resistance value $R_1$. Herein, the expression "matched" elements refers to elements having substantially the same parameters and structures. The voltages at the non-inverting and inverting inputs of the operational amplifier 413 are the same, thus the differential voltage across the sensing resistor Rs1 falls on the resistor R411 in the first branch of the current mirror circuit 410, and the generated additional current flows into the sensing voltage output branch 420.

As shown in FIG. 4, the sensing voltage output branch 420 includes an NPN bipolar transistor Q1 and a gain-setting resistor R43. The collector of the transistor Q1 is connected to one end of the resistor R411 in the current mirror circuit 410, its base is connected to output terminal of the operational amplifier 413 in the current mirror circuit 410, its emitter is connected to one end of the gain-setting resistor R43, and the other end of the gain-setting resistor R43 is connected to the ground. The voltage SNS is output from the non-grounded end of the gain-setting resistor R43, and is proportional to the sensing current $I_S$ and the proportion is $K_1$, i.e., $SNS=K_1*I_S$.

Specifically, as stated previously, the differential voltage across the sensing resistor Rs1, i.e., $(V_S-V_L)(=R_S*I_S)$ all falls on the resistor R411, and its corresponding extra current $(R_s*I_S/R_1)$ flows into the sensing voltage output branch 420, where $R_S$ is the resistance value of the resistor Rs1, and $R_1$ is the resistance value of the resistor R411. That is to say, the collector current of the transistor Q1, i.e., $I_{c1}=(R_s/R_1)*I_S$. Furthermore, in the case that the gain of the transistor Q1, i.e., $\beta1\gg1$ (e.g., >10), it may be assumed that the emitter current of the transistor Q1 is approximately equal to the collector current $I_{c1}$. Since the emitter current of the transistor Q1 flows through the resistor R43 (its resistance value is set as $R_3$), the second level output from the output current sensor 112, i.e., $SNS=R_3*I_{c1}=R_3*(R_s/R_1)*I_S=K_1*I_{out}$, where $K_1=R_3*R_s/R_1$. That is to say, the output voltage SNS is in a certain proportion K1 to the output current of the power supply, and this proportion is directly proportional to the resistance values of the resistors R43 and Rs1, and is inversely proportional to the resistance value of the resistor R411.

The present invention can be implemented using the current sensor of FIG. 4. However, it will be understood by those skilled in the art that the structure of the current sensor shown in FIG. 4 is not intended to limit the present invention, and that the circuit of FIG. 4 can be modified (for example, changing a NPN transistor into a PNP transistor, adding one or more resistor(s), or the like), or other known or future developed current sensor structures can also be used. It will be understood by those skilled in the art that, each of the current sensors 112 in FIG. 1 may employ various kinds of high-side current sampling methods, as long as the output sensing level is in a certain proportion to the power supply current and preferably the proportion is easy to adjust.

Figure 5A:
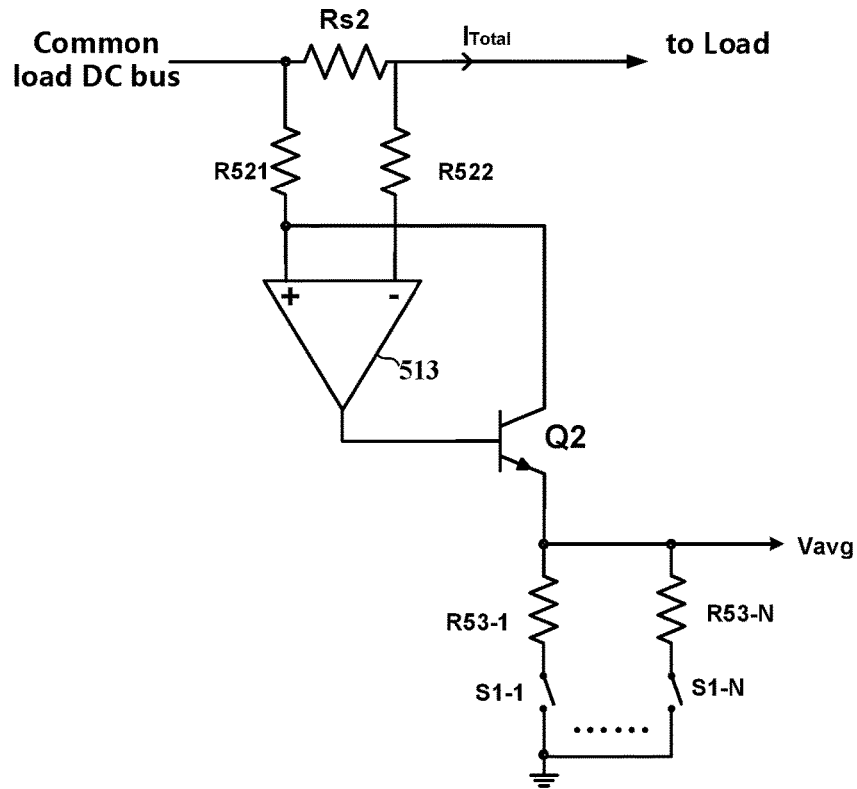
Figure 5B:
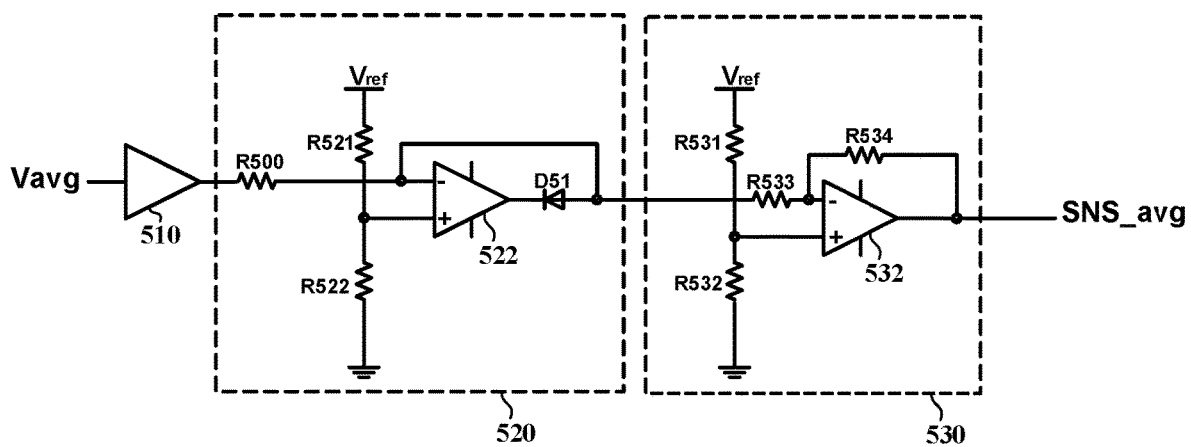

FIGS. 5A and 5B schematically illustrate a configuration of the average load current sensor 111 of FIG. 1 according to an example embodiment of the present invention. The average load current sensor 111 includes an average current sensing portion and a processing portion, and the average current sensing portion outputs a voltage proportional to the average load current to the processing portion which then outputs the first level control signal SNS_avg (see FIG. 1) after processing the input voltage. FIG. 5A shows one example of the average current sensing portion, and FIG. 5B shows one example of the processing portion.

As shown in FIG. 5A, the average current sensing portion, which is connected between the common load DC bus and the load, senses the total current $I_{Total}$ supplied to the load, and outputs a voltage $V_{avg}$ proportional to the average load current. The average current sensing portion may have the same circuit topology as the output current sensor 112 shown in FIG. 4, and the parameters of the respective corresponding devices may also be the same. However, in order to obtain the average load current $I_{avg}$, the gain-setting resistor R43 of FIG. 4 is replaced with N parallel-connected gain-setting resistor branches, and each of the gain-setting resistor branches is composed of one of resistors R53-1 to R53-N and one of switches S1-1 to S1-N in series, where these resistors have the same resistance values (i.e., $R_3$), and ON/OFF states of these switches are controlled by the respective enable signals Enable_1 to Enable_N of the power supplies. When the enable signal is active, the switch is turned on; and when the enable signal is inactive, the switch is turned off. Therefore, the number of power supplies that are turned on is equal to the number of the parallel-connected gain-setting resistors. Assume that the number of power supplies that are turned on is M (M N), then the total equivalent resistance value of all of the gain-setting resistors is $R_3/M$. According to the previous discussion regarding FIG. 4, the output voltage in FIG. 5A, i.e., $V_{avg}=M=K_1*I_{avg}$, where $K_1=R_3*R_s/R_1$. That is to say, the output voltage $V_{avg}$ is also in a certain proportion, i.e., $K_1$, to the average load current.

As shown in FIG. 5B, the output voltage $V_{avg}$ is input to the processing portion, processed by three stages of circuits, and then output as the first level control signal SNS_avg shown in FIG. 1, where SNS_avg=$V_{ref}-V_{avg}=V_{ref}-K_1*I_{avg}$, and $V_{ref}$ is the reference voltage in the figure.

Specifically, the processing portion includes an input buffer 510, a level clamper 520, and a subtractor 530 that are sequentially connected.

The input buffer 510 is used for input impedance matching.

The level clamper 520 is used for limiting the upper limit of the input voltage, which comprises an operational amplifier 522, resistors R521 and R522 connected in series between the reference voltage $V_{ref}$ and the ground, a resistor R500 connected between the output of the input buffer 510 and the inverting input of the operational amplifier 522, and a diode D51 whose cathode is connected to the output of the operational amplifier 522. The anode of diode D51 is connected to the inverting input of the operational amplifier 522, and the common terminal of the resistors R521 and R522 is connected to the non-inverting input of the operational amplifier 522, so that a clamping voltage of $V_{ref}*R522/(R521+R522)$ is provided, where R521 and R522 are the resistance values of the resistors R521 and R522, respectively. When the input voltage $V_{avg}$ is lower than the clamp voltage, the clamp circuit 520 outputs the input voltage $V_{avg}$; and when the output voltage $V_{avg}$ exceeds the clamp voltage, the output of the clamp circuit 520 is clamped at the clamp voltage.

The subtractor 530 subtracts the input voltage $V_{avg}$ from the reference voltage $V_{ref}$, and outputs the difference voltage SNS_avg=$(V_{ref}-V_{avg})$. Specifically, the subtractor 530 includes an operational amplifier 532, resistors R531 and R532 connected in series between the reference voltage $V_{ref}$ and the ground, a resistor R533 connected between the output of the level clamper 520 and the inverting input of the operational amplifier 532, and a resistor R534 connected between the output and the inverting input of the operational amplifier 532. The common end of the resistors R531 and R532 is connected to the non-inverting input of the operational amplifier 532. The resistance values of the resistors R531, R532, R533 and R534 are the same, i.e., R53, and thus the output voltage of the subtractor 530 can be derived as SNS_avg=$(V_{ref}-V_{avg})$.

It will be understood by those skilled in the art that the structure of the average current sensor shown in FIGS. 5A and 5B is not intended to limit the present invention, but the circuit of FIGS. 5A and 5B can be modified as needed (for example, it may not be necessary to include the processing portion, the average current sensing portion does not necessarily have exactly the same structure and/or parameters as those of FIG. 4, the input buffer 510, the clamp circuit 520, etc. may be removed, or the like), or other known or future developed current sensors can also be used.

Figure 6:
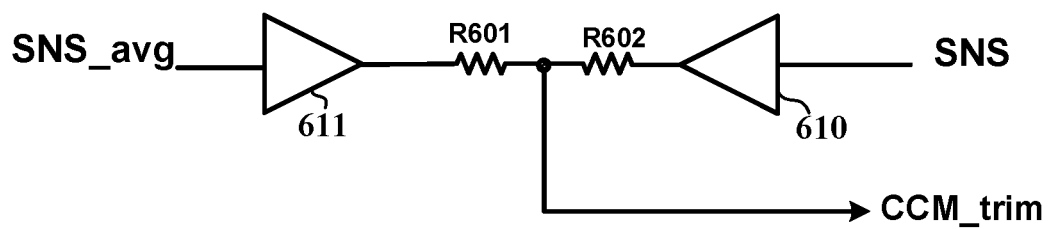
FIG. 6 is a schematic circuit diagram of a feedback signal generator according to one or more exemplary embodiments of the present invention.

FIG. 6 schematically illustrates a configuration of the feedback signal generator 113 in FIG. 1, according to an example embodiment of the present invention. The feedback signal generator 113 generates a feedback signal CCM_trim based on the first level control signal SNS_avg and the second level control signal SNS, and provides the feedback signal CCM_trim to the power supply 101-1.

As shown in FIG. 6, the feedback signal generator 113 may be implemented as an adder that receives the output SNS of the output current sensor 112 and the output SNS_avg of the average load current sensor 111, and generates the feedback signal CCM_trim=(SNS+SNS_avg)/2. Specifically, the feedback signal generator 113 includes resistors R601 and R602 connected in series, and a buffer 610 for impedance matching. The resistor R601 receives the output voltage SNS_avg, the resistor R602 receives the output voltage SNS, and the buffer 610 is provided between the resistor R602 and the output voltage SNS. In addition, a buffer 611 for impedance matching may also be provided between the resistor R601 and the output voltage SNS_avg. The resistance values of the resistors R601 and R602 are the same, and thus the voltage output from the common terminal of the resistors R601 and R602 can be derived as CCM_trim=(SNS+SNS_avg)/2. Substituting SNS and SNS_avg obtained in the above recitations regarding FIGS. 4 to 5B, CCM_trim=$(K_1*I_{out}+V_{ref}-K_1*I_{avg})/2=V_{ref}/2+K_1/2*(I_{out}-I_{avg})$. It can be seen that the signal CCM_trim is linearly related to the difference (i.e., $I_{out}-I_{avg}$) between the output current and the average load current.

In some cases, the operating mode of the power supply can be determined by feeding back the signal CCM_trim to the power supply, so that when $I_{out}>I_{avg}$, the power supply switches to the CC mode, causing the output voltage to drop sharply, thereby pulling $I_{out}$ down to $I_{avg}$. Therefore, the output current of the power supply can be adjusted in a simple manner to automatically share the load.

However, it will be understood by those skilled in the art that the structure of the feedback signal generator 113 shown in FIG. 6 is not intended to limit the present invention, but the circuit of FIG. 6 can be modified as needed, or other known or future developed structures can also be used.

A specific example of the structure of the CV/CC power supply according to the present disclosure and its operation principle will be described below with reference to the example of the feedback signal CCM_trim provided in FIG. 6.

Figure 3:
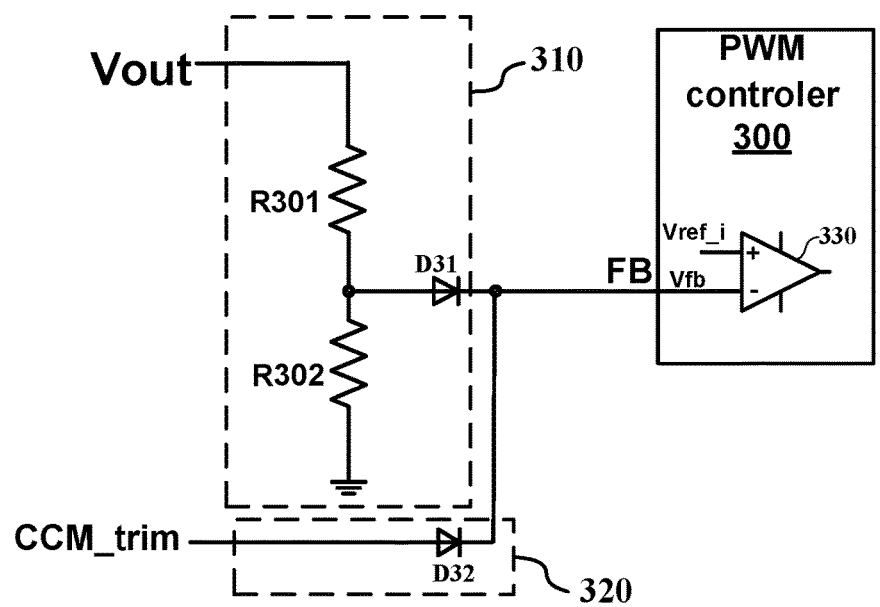
FIG. 3 is a schematic circuit diagram of a CV/CC power supply according to one or more exemplary embodiments of the present invention.

FIG. 3 schematically illustrates one specific example for the structure of a CV/CC power supply according to an example embodiment of the present invention.

As shown in FIG. 3, the CV/CC power supply includes a pulse width modulation (PWM) controller 300 that adjusts the output voltage of the power supply by changing the pulse width. Generally, the PWM controller 300 includes a feedback voltage terminal FB for receiving a feedback voltage $V_{fb}$, and an error amplifier 330. The error amplifier 330 compares the feedback voltage $V_{fb}$ with an internal reference voltage $V_{ref\_i}$, so as to adjust the output voltage of the CV/CC power supply. Those skilled in the art will appreciate that the PWM controller 300 may also include other terminals and other components not shown in the drawings, and that the present invention is applicable to various kinds of structures and arrangements of the PWM controller 300 and its internal components (e.g., the error amplifier 330), which will not be illustrated and discussed here.

In order to realize the CV/CC mode of the power supply, generally one constant current feedback network and one constant voltage feedback network may be connected at the feedback voltage terminal FB of the PWM controller 300. The constant voltage feedback network and the constant current feedback network are used to respectively feed the sample of the output voltage and the sample of the output current back to the feedback voltage terminal FB, so as to set the constant voltage mode or the constant current mode. In some other implementations, one resistor may also be connected to the feedback voltage terminal FB as needed, and the other end of the resistor is grounded.

FIG. 3 shows one specific example for a constant voltage feedback network 310 and a constant current feedback network 320 according to the present invention. The constant current feedback network 320 receives the feedback signal CCM_trim=$V_{ref}/2+K_1/2*(I_{out}-I_{avg})$. The constant voltage feedback network 310 receives the output voltage $V_{out}$ of the power supply.

The constant voltage feedback network 310 includes two resistors R301 and R302 connected in series between the output voltage $V_{out}$ and ground, and a diode D31. The common terminal of the resistors R301 and R302 is connected to the anode of the diode D31, and the cathode of the diode D31 is connected to the feedback voltage terminal FB.

The constant current feedback network 320 includes only a diode D32, whose anode is connected to the feedback signal CCM_trim, and whose cathode is connected to the feedback voltage terminal FB.

The constant voltage feedback network 310 and the constant current feedback network 320 utilize the diodes D31 and D32 for an OR logic operation. That is, when the output current is small, the power supply operates in the constant voltage mode, and when the output current becomes large enough, the power supply will operate in the constant current mode. In the constant voltage mode, the sample of the output voltage is stabilized at the sum of the internal reference voltage $V_{ref\_i}$ and the forward voltage drop $V_{D31}$ of the diode D31. In the constant current mode, the sample of the output current is stabilized at the sum of the internal reference voltage $V_{ref\_i}$ and the forward voltage drop $V_{D32}$ of the diode D32. As described above, the feedback signal CCM_trim=$(V_{ref}/2+K_1/2*(I_{out}-I_{avg}))$ is directly connected to the anode of the diode D32, and can be stabilized at $V_{ref\_i}+V_{D32}$, by using the error amplifier 330 in the PWM controller 300. By setting $V_{ref}/2$ to be equal to $V_{ref\_i}+V_{D32}$, the difference $(I_{out}-I_{avg})$ between the output current and the average load current can be substantially eliminated, that is, the output current $I_{out}$ of the power supply is stabilized at the average load current $I_{avg}$.

According to the present invention, the load current can be automatically and uniformly shared by multiple power supplies with relatively high precision, and the solution of the present invention can be widely applied to various kinds of power supplies. In addition, the current-sharing control circuit can be built by using the current detection circuit whose gain can be adjusted by parallel-connected resistors, so that the current sharing control can be realized simply and at low cost.

Please note that, herein, when an element is described as located "on", "attached" to, "connected" to, "coupled" to or "in contact with" another element, etc., the element can be directly located on, attached to, connected to, coupled to or in contact with the other element, or there may be one or more intervening elements present. In contrast, when an element is described as "directly" located "on", "directly attached" to, "directly connected" to, "directly coupled" to or "in direct contact with" another element, there are no intervening elements present. In the description, references that a first element is arranged "adjacent" a second element can mean that the first element has a part that overlaps the second element or a part that is located above or below the second element.

Herein, the foregoing description may refer to elements or nodes or features being "coupled" together. As used herein, unless expressly stated otherwise, "coupled" means that one element/node/feature may be mechanically, electrically, logically or otherwise joined to another element/node/feature in either a direct or indirect manner to permit interaction even though the two features may not be directly connected. That is, "coupled" is intended to encompass both direct and indirect joining of elements or other features, including connection with one or more intervening elements.

Herein, terms such as "upper", "lower", "left", "right", "front", "rear", "high", "low" may be used to describe the spatial relationship between different elements as they are shown in the drawings. It should be understood that in addition to orientations shown in the drawings, the above terms may also encompass different orientations of the device during use or operation. For example, when the device in the drawings is inverted, a first feature that was described as being "below" a second feature can be then described as being "above" the second feature. The device may be oriented otherwise (rotated 90 degrees or at other orientation), and the relative spatial relationship between the features will be correspondingly interpreted.

Herein, the term "A or B" used through the specification refers to "A and B" and "A or B" rather than meaning that A and B are exclusive, unless otherwise specified.

The term "exemplary", as used herein, means "serving as an example, instance, or illustration", rather than as a "model" that would be exactly duplicated. Any implementation described herein as exemplary is not necessarily to be construed as preferred or advantageous over other implementations. Furthermore, there is no intention to be bound by any expressed or implied theory presented in the detailed description.

Herein, the term "substantially", is intended to encompass any slight variations due to design or manufacturing imperfections, device or component tolerances, environmental effects and/or other factors. The term "substantially" also allows for variation from a perfect or ideal case due to parasitic effects, noise, and other practical considerations that may be present in an actual implementation.

Herein, certain terminology, such as the terms "first", "second" and the like, may also be used for the purpose of reference only, and thus are not intended to be limiting. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, steps, operations, elements, and/or components, but do not preclude the presence or addition of one or more other features, steps, operations, elements, components, and/or groups thereof.

Although some specific embodiments of the present invention have been described in detail with examples, it should be understood by a person skilled in the art that the above examples are only intended to be illustrative but not to limit the scope of the present invention. The embodiments disclosed herein can be combined arbitrarily with each other, without departing from the scope and spirit of the present invention. It should be understood by a person skilled in the art that the above embodiments can be modified without departing from the scope and spirit of the present invention. The scope of the present invention is defined by the attached claims.

That which is claimed is:

1. A power supply system, comprising:
   a plurality of CV/CC power supplies that are configured to connect in parallel to a load, wherein a nominal output voltage of each of the plurality of CV/CC power supplies is a same value, and wherein a CV mode to CC mode switching point of each of the CV/CC power supplies is adjustable, and
   a current-sharing control circuit that includes an average load current sensor and a plurality of output current sensors,
   wherein the average load current sensor is configured to sense a total current supplied to the load and is configured to output a first level control signal that is linearly related to an average load current, the average load current being the total current divided by a number of CV/CC power supplies supplying power to the load,
   wherein each output current sensor is configured to sense an output current of a respective CV/CC power supply of the plurality of CV/CC power supplies, and is configured to output a second level control signal that is linearly related to the output current of the respective CV/CC power supply, and
   wherein the current-sharing control circuit is configured to generate a plurality of feedback signals, each feedback signal based on the first level control signal and a respective one of the second level control signals, and is configured to provide each feedback signal to a corresponding CV/CC power supply of the plurality of CV/CC power supplies, so as to adjust a switching point of the corresponding CV/CC power supply to the average load current.

2. The power supply system according to claim 1, wherein the current-sharing control circuit further comprises a system controller that is configured to output enable signals to the CV/CC power supplies so as to enable or disable selectively each CV/CC power supply of the plurality of CV/CC power supplies, and is configured to provide the enable signals to the average load current sensor.

3. The power supply system according to claim 1, wherein each output current sensor includes a high-side current detecting circuit which is configured to sense the output current of the respective CV/CC power supply and is configured to output, as the second level control signal, a sensing voltage that is proportional to the output current of the respective CV/CC power supply.

4. The power supply system according to claim 3, wherein a first of the high-side current detecting circuits comprises:
   a sensing resistor, having a first end coupled to the output of a first CV/CC power supply and a second end coupled to the load, wherein the output current of the first CV/CC power supply flows substantially through the sensing resistor;
   a current mirror circuit, having first and second branches respectively connected to the first and second ends of the sensing resistor; and
   a sensing voltage output branch connected to the first branch of the current mirror circuit, and configured to output a sensing voltage that is proportional to a differential voltage across the sensing resistor such that the sensing voltage is proportional to the output current of the first CV/CC power supply.

5. The power supply system according to claim 4, wherein the first and second branches of the current mirror circuit respectively comprise first and second matched resistors, a first end of the first matched resistor is connected to the first end of the sensing resistor, and a first end of the second matched resistor is connected to the second end of the sensing resistor, and
   wherein the sensing voltage output branch includes a bipolar transistor and a gain-setting resistor, wherein a collector and an emitter of the bipolar transistor are respectively connected to a second end of the first matched resistor and a first end of the gain-setting resistor, wherein a second end of the gain-setting resistor is connected to ground, and wherein the sensing voltage that is output by the sensing voltage output branch is directly proportional to the output current of the first CV/CC power supply and a resistance value of the gain-setting resistor.

6. The power supply system according to claim 5, wherein the current mirror circuit further comprises:
   an operational amplifier, wherein a non-inverting input of the operational amplifier is connected to the second end of the first matched resistor, an inverting input of the operational amplifier is connected to a second end of the second matched resistor, and an output of the operational amplifier is connected to a base of the bipolar transistor.

7. The power supply system according to claim 6, wherein the current-sharing control circuit further comprises a system controller, which is configured to output an enable signal to each of the plurality of CV/CC power supplies so as to enable or disable the CV/CC power supplies selectively, the current-sharing control circuit further configured to provide the enable signals to the average load current sensor,
   wherein the average load current sensor includes an average current sensing portion which is configured to output a second sensing voltage that is proportional to the average load current,
   wherein a gain-setting resistance in the average load current sensor is composed of multiple parallel-connected gain-setting resistor branches, and each of the gain-setting resistor branches is composed of a resistor and a switch in series, wherein each resistor of the gain-setting resistor branches has an equal resistance value as the gain-setting resistor in the output current sensor, and ON/OFF state of the switch is controlled by the respective enable signal, and a number of the gain-setting resistor branches is equal to a total number of the CV/CC power supplies.

8. The power supply system according to claim 3, wherein the average load current sensor comprises an average current sensing portion, and wherein the average current sensing portion is configured to output a second sensing voltage in a first proportion to the average load current.

9. The power supply system according to claim 8, wherein the average load current sensor further comprises a processing portion, wherein the processing portion is configured to receive the second sensing voltage and is configured to output, as the first level control signal, a difference voltage of a first reference voltage minus the second sensing voltage.

10. The power supply system according to claim 9, wherein the processing portion includes an input buffer, a clamp circuit, and a subtractor that are sequentially connected.

11. The power supply system according to claim 9, wherein the current-sharing control circuit further comprises multiple feedback signal generators respectively connected to the respective CV/CC power supplies, and one of the multiple feedback signal generators comprises an adder that is configured to add the first level control signal and the corresponding second level control signal and output a resulting sum signal as the feedback signal.

12. The power supply system according to claim 1, wherein the current-sharing control circuit further comprises a plurality of feedback signal generators each connected to a respective one of the CV/CC power supplies, each multiple feedback signal generators configured to respectively receive the first level control signal and a respective one of the second level control signals, and output to their corresponding CV/CC power supplies the feedback signal in a linear relationship with a difference between the output current and the average load current.

13. The power supply system according to claim 1, wherein a first CV/CC power supply of the plurality of CV/CC power supplies comprises a PWM controller including a feedback voltage terminal configured to receive a feedback voltage, and including an error amplifier, the error amplifier configured to compare the feedback voltage with an internal reference voltage so as to adjust an output voltage of the first CV/CC power supply, and the first CV/CC power supply further comprises a constant current feedback network and a constant voltage feedback network that are both connected to the feedback voltage terminal, wherein the constant current feedback network is configured to receive the feedback signal, and the constant voltage feedback network is configured to receive the output voltage of the first CV/CC power supply.

14. The power supply system according to claim 13, wherein the feedback signal is a sum of the internal reference voltage and a product of a coefficient and a difference between the output current and the average load current, and the constant current feedback network is a first diode whose anode is connected to the feedback signal and whose cathode is connected to the feedback voltage terminal.

15. The power supply system according to claim 14, wherein the constant voltage feedback network comprises a second diode and two resistors series- connected between the output voltage of the first CV/CC power supply and ground, a common terminal of the two resistors is connected to an anode of the second diode, and a cathode of the second diode is connected to the feedback voltage terminal.

16. A current-sharing control circuit which is configurable to be connected to a plurality of CV/CC power supplies and is configured to enable at least two of the plurality of CV/CC power supplies to share a load, wherein a nominal output voltage of each of the CV/CC power supplies is a same value, and wherein a CV mode to CC mode switching point of each of the CV/CC power supplies is adjustable, the current-sharing control circuit comprising:

an average load current sensor that is configured to sense a total current supplied to the load and to output a first level control signal that is linearly related to an average load current, the average load current being the total current divided by a number of CV/CC power supplies that are supplying power to the load, and a plurality of output current sensors that are connected respectively to outputs of the plurality of CV/CC power supplies, wherein each output current sensor is configured to sense an output current from the CV/CC power supply corresponding thereto, and each output current sensor is configured to output a second level control signal that is linearly related to the output current from the CV/CC power supply corresponding thereto, resulting in a plurality of second level control signals, wherein the current-sharing control circuit is configured to receive the first level control signal and the plurality of second level control signals, and is configured to provide feedback signals based on the first level control signal and the plurality of second level control signals to the CV/CC power supplies, so as to adjust a switching point of the CV/CC power supplies to the average load current.

17. The current-sharing control circuit according to claim 16, further comprising a system controller, which is configured to output an enable signal to each of the CV/CC power supplies so as to enable or disable selectively the CV/CC power supplies, and which is configured to provide the enable signals to the average load current sensor.

18. The current-sharing control circuit according to claim 16, wherein each output current sensor comprises a high-side current detecting circuit that is configured to sense the output current from the CV/CC power supply corresponding thereto, and output, as the second level control signal, a sensing voltage that is proportional to the output current of the CV/CC power supply.

19. The current-sharing control circuit according to claim 16, further comprising a plurality of feedback signal generators that are connected to the respective CV/CC power supplies, the feedback signal generators configured to respectively receive the first level control signal and a respective one of the second level control signals, and configured to output to their corresponding CV/CC power supplies the feedback signal in a linear relationship with a difference between the output current and the average load current.

20. A method for performing current-sharing control on a plurality of CV/CC power supplies that are connected in parallel to a load, wherein each of the plurality of CV/CC power supplies has a same nominal output voltage, and wherein a CV mode to CC mode switching point of each of the CV/CC power supplies is adjustable, the method comprising:

sensing a total current supplied to the load and outputting a first level control signal that is linearly related to an average load current, the average load current being the total current divided by a number of CV/CC power supplies that are supplying power to the load, sensing a respective output current of each of the CV/CC power supplies, and outputting a respective second level control signal for each of the CV/CC power supplies that is linearly related to the sensed respective output current thereof, and providing a feedback signal to each of the CV/CC power supplies, each feedback signal based on the first level control signal and the second level control signal to the respective CV/CC power supplies, so as to adjust a switching point of the corresponding CV/CC power supply to the average load current.

\* \* \* \* \*